(12) United States Patent
Murata et al.

(10) Patent No.: US 12,475,413 B2
(45) Date of Patent: Nov. 18, 2025

(54) DISPLAY CONTROL METHOD AND DISPLAY CONTROL DEVICE

(71) Applicant: TOYOTA JIDOSHA KABUSHIKI KAISHA, Toyota (JP)

(72) Inventors: Soshiro Murata, Toyota (JP); Hiroshi Umeno, Nisshin (JP); Takahiro Nomura, Okazaki (JP); Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 18/505,586

(22) Filed: Nov. 9, 2023

(65) Prior Publication Data

US 2024/0249212 A1   Jul. 25, 2024

(30) Foreign Application Priority Data

Jan. 19, 2023   (JP) ................... 2023-006429

(51) Int. Cl.
*G06Q 10/0631* (2023.01)
*B60L 53/66* (2019.01)
(Continued)

(52) U.S. Cl.
CPC ........ *G06Q 10/06311* (2013.01); *B60L 53/66* (2019.02); *B60L 53/68* (2019.02); *B60L 53/80* (2019.02)

(58) Field of Classification Search
CPC ............. G06Q 10/063; G06Q 10/0631; G06Q 10/06311; B60L 53/66; B60L 53/68; B60L 53/80
See application file for complete search history.

(56) References Cited

U.S. PATENT DOCUMENTS

2013/0310112 A1* 11/2013 You ................... H04W 52/0267
455/566
2019/0009683 A1* 1/2019 Saito ..................... G06Q 10/06
(Continued)

FOREIGN PATENT DOCUMENTS

CN           109800899 A        5/2019
WO    WO-2023101976 A1 *  6/2023  ............. B60L 53/56
WO    WO-2023113759 A2 *  6/2023  ............. B60L 53/11

OTHER PUBLICATIONS

Tian, Zhiyong, et al. "Real-time charging station recommendation system for electric-vehicle taxis." IEEE Transactions on Intelligent Transportation Systems 17.11 (2016): 3098-3109. (Year: 2016).*
(Continued)

*Primary Examiner* — William S Brockington, III
(74) *Attorney, Agent, or Firm* — SoraIP, Inc.

(57) ABSTRACT

A display control method is a display control method that is performed by an ECU of a vehicle that controls an HMI for displaying information on a charging station and a replacing station of a battery mounted on the vehicle and a CPU of a management server. The display control method includes the steps of: calculating, by the CPU of the management server, a waiting time using the number of waiting vehicles at the charging station or the replacing station and the time required to charge or replace a battery per vehicle; controlling, by the ECU of the vehicle, the HMI to display the information on the charging station or the replacing station in a predetermined display mode according to the calculated waiting time.

7 Claims, 4 Drawing Sheets

(51) Int. Cl.
*B60L 53/68* (2019.01)
*B60L 53/80* (2019.01)

(56) References Cited

U.S. PATENT DOCUMENTS

| | | | |
|---|---|---|---|
| 2022/0050143 A1* | 2/2022 | Maeda | G01R 31/382 |
| 2022/0082397 A1* | 3/2022 | Zhang | G01C 21/3679 |
| 2024/0116393 A1* | 4/2024 | Saito | B60L 53/67 |

OTHER PUBLICATIONS

Schoenberg, Sven, and Falko Dressler. "Reducing waiting times at charging stations with adaptive electric vehicle route planning." IEEE Transactions on Intelligent Vehicles 8.1 (2022): 95-107. (Year: 2022).*

* cited by examiner

| NAME | TYPE | EXPECTED ARRIVAL TIME | WAITING TIME |
|---|---|---|---|
| A STATION | CHARGING STATION | 5 MINUTES | 10 MINUTES |
| D STATION | REPLACEMENT STATION | 18 MINUTES | 16 MINUTES |
| C STATION | CHARGING STATION | 12 MINUTES | 24 MINUTES |
| E STATION | REPLACEMENT STATION | 15 MINUTES | 37 MINUTES |
| B STATION | CHARGING STATION | 9 MINUTES | 45 MINUTES |
| ⋮ | | | |

DISPLAY CONTROL METHOD AND DISPLAY CONTROL DEVICE

CROSS-REFERENCE TO RELATED APPLICATION

This application claims priority to Japanese Patent Application No. 2023-006429 filed on Jan. 19, 2023, incorporated herein by reference in its entirety.

BACKGROUND

1. Technical Field

The present disclosure relates to display control methods and display control devices, and more particularly, to a display control method that is performed by a display control device configured to control a display device configured to display information on a charging facility and a replacement facility for a battery mounted on a vehicle, and a display control device configured to control a display device configured to display information on a charging facility and a replacement facility for a battery mounted on a vehicle.

2. Description of Related Art

Conventionally, there is a system that calculates the degree of congestion based on the number of batteries that can be replaced at a vehicle battery replacement station and the number of waiting vehicles at the replacement station, and displays the location of the replacement station on a map with a green icon when the degree of congestion is normal, a yellow icon when the degree of congestion indicates a busy state, and a red icon when the replacement station is not available (see, for example, Chinese Unexamined Patent Application Publication No. 109800899).

SUMMARY

The time it takes to replace a battery of one vehicle at a battery replacement facility is different from the time it takes to charge a battery of one vehicle at a battery charging facility. For example, the battery replacement takes about five minutes while the battery charging takes about 30 minutes, although it depends on the situation. Therefore, the waiting time is different even if the replacement facility and the charging facility have the same length of waiting line. However, if a replacement facility and a charging facility that have about the same length of waiting line are displayed with icons of the same color on a map on the screen of the vehicle, the user who looks at the map may misunderstand that the replacement facility and the charging facility have the same degree of congestion and have about the same waiting time.

The present disclosure was made to solve the above problem, and it is an object of the present disclosure to provide a display control method and a display control device that can reduce user's misunderstanding regarding waiting times for a charging facility and a replacement facility.

A display control method according to one aspect of the present disclosure is a display control method that is performed by a control device configured to control a display device, the display device being configured to display information on a charging facility and a replacement facility for a battery mounted on a vehicle.

The display control method includes the steps of: calculating, by the control device, a waiting time using the number of waiting vehicles at the charging facility or the replacement facility and a time required to charge or replace the battery per vehicle; and controlling, by the control device, the display device to display the information on the charging facility or the replacement facility in a predetermined display mode according to the calculated waiting time.

According to such a configuration, the information on the charging facility or the replacement facility for the battery mounted on the vehicle can be displayed in the predetermined display mode according to the waiting time calculated using the number of waiting vehicles at the charging facility or the replacement facility and the time required to charge or replace the battery per vehicle. As a result, it is possible to provide a display control method that can reduce user's misunderstanding regarding waiting times for a charging facility and a replacement facility.

In the step of calculating the waiting time, the control device may calculate the waiting time in consideration of the number of vehicles that are simultaneously chargeable at the charging facility or the number of vehicles whose batteries are simultaneously replaceable at the replacement facility.

According to such a configuration, the waiting time can be more accurately calculated. As a result, the user's misunderstanding regarding the waiting times for the charging facility and the replacement facility can further be reduced.

In the step of calculating the waiting time, the control device may calculate the waiting time in consideration of the number of replaceable batteries stored at the replacement facility.

According to such a configuration, the waiting time can be more accurately calculated. As a result, the user's misunderstanding regarding the waiting times for the charging facility and the replacement facility can further be reduced.

In the step of controlling the display device to display the information on the charging facility or the replacement facility, the control device may control the display device to display the information on the charging facility or the replacement facility for which the waiting time is equal to or less than a predetermined time.

According to such a configuration, the information can be transmitted to the user in an easy-to-understand manner. As a result, the user's misunderstanding regarding the waiting times for the charging facility and the replacement facility can further be reduced.

A display control device according to another aspect of the present disclosure is configured to control a display device, the display device being configured to display information on a charging facility and a replacement facility for a battery mounted on a vehicle. The display control device includes a processor and an interface with the display device.

The processor is configured to calculate a waiting time using the number of waiting vehicles at the charging facility or the replacement facility and a time required to charge or replace the battery per vehicle, and control the display device via the interface to display the information on the charging facility or the replacement facility in a predetermined display mode according to the calculated waiting time.

According to such a configuration, it is possible to provide a display control device that can reduce user's misunderstanding regarding waiting times for a charging facility and a replacement facility.

According to the present disclosure, it is possible to provide a display control method and a display control device that can reduce user's misunderstanding regarding waiting times for a charging facility and a replacement facility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. In the drawings, the same or corresponding portions are denoted by the same reference signs and the description thereof will not be repeated.

First Embodiment

Figure 1:
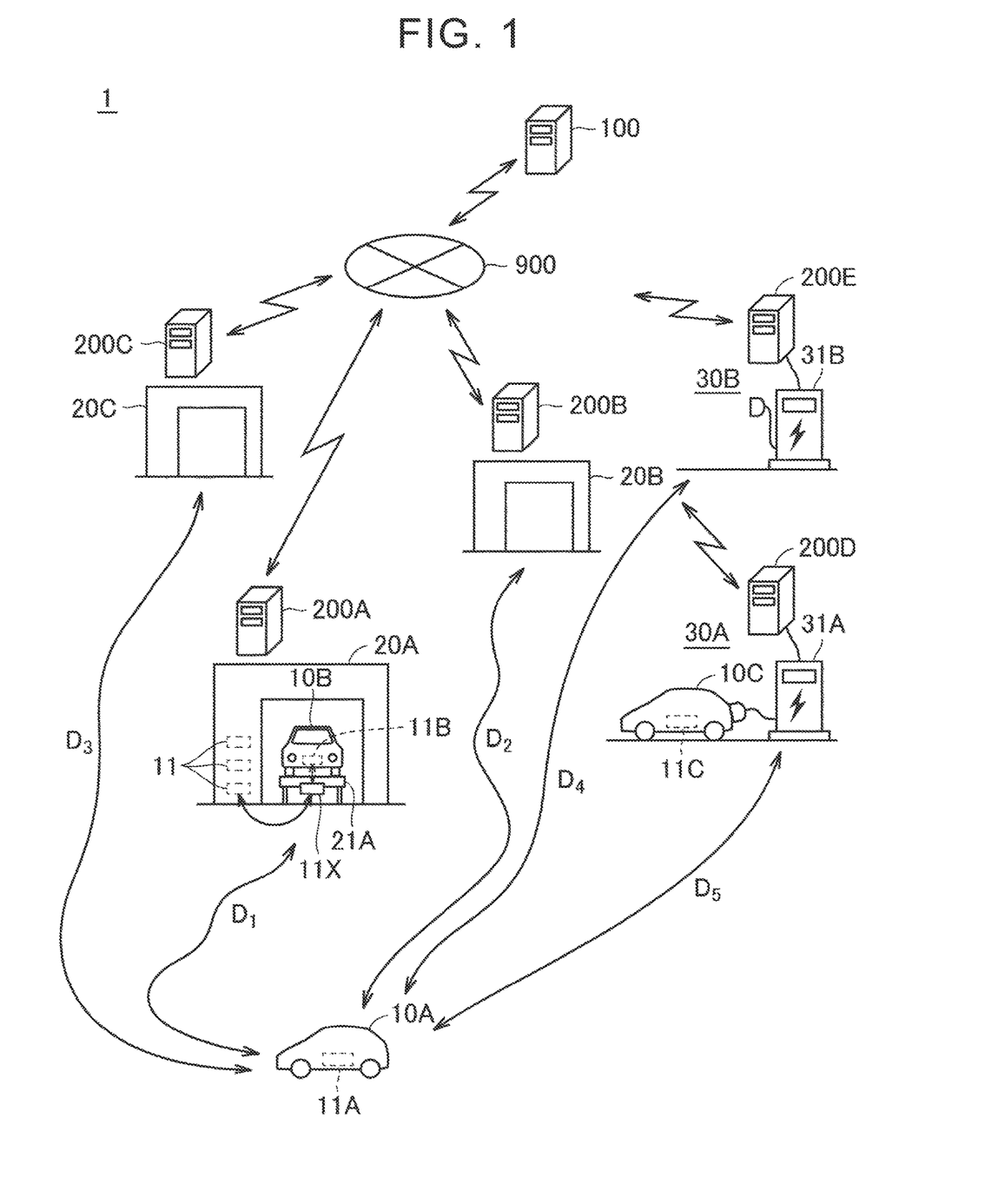
FIG. 1 is a diagram illustrating a configuration of a battery charging/replacement information providing system according to this embodiment.
Figure 2:
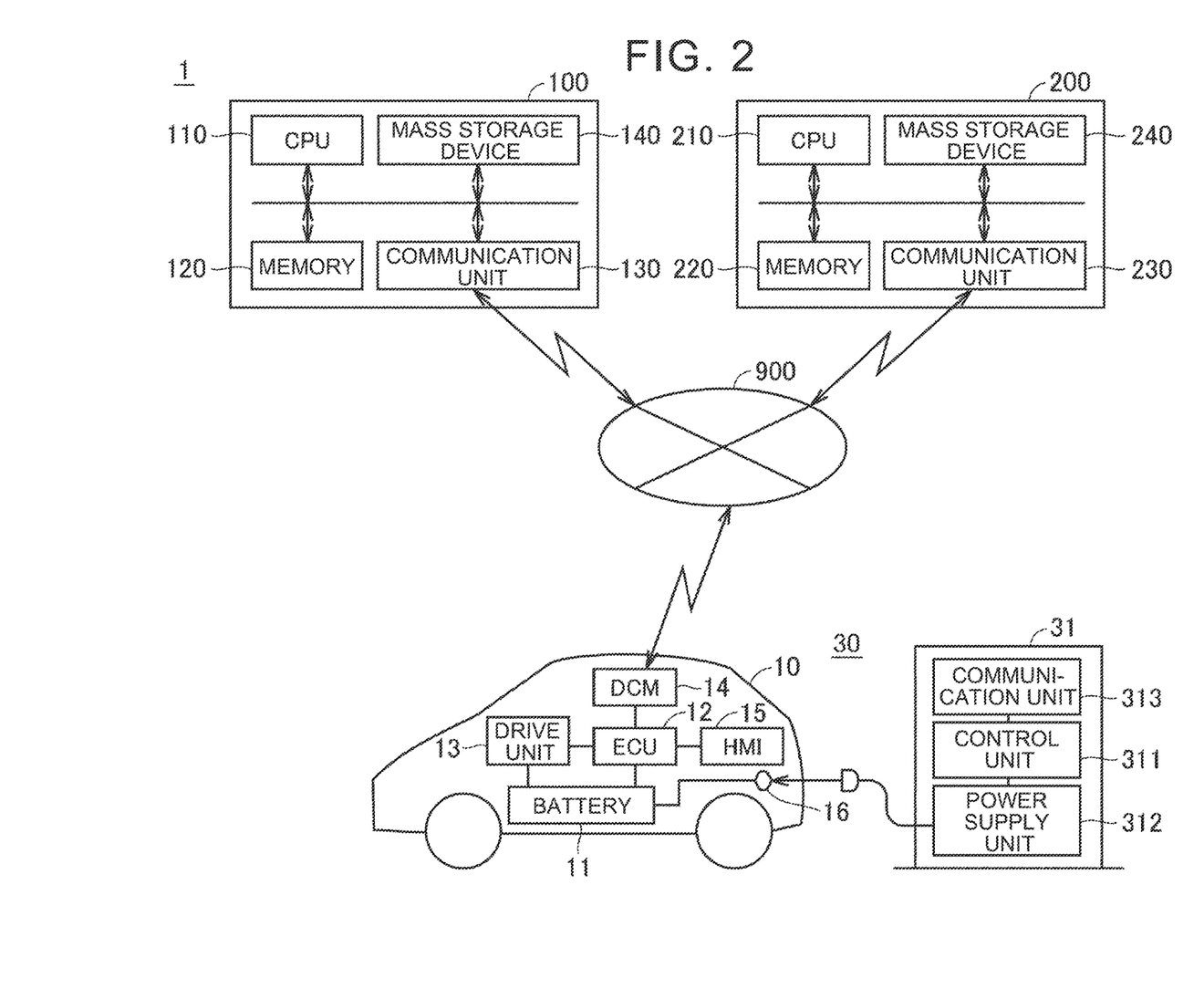
FIG. 2 is a block diagram illustrating an outline of a configuration of each device included in the battery charging/replacement information providing system according to the embodiment.

FIG. 1 is a diagram illustrating a configuration of a battery charging/replacement information providing system 1 according to this embodiment. FIG. 2 is a block diagram schematically showing a configuration of each device included in the battery charging/replacement information providing system 1 according to the embodiment. Referring to FIGS. 1 and 2, the battery charging/replacement information providing system 1 includes: a plurality of vehicles 10A to 10C (hereinafter sometimes representatively referred to as "vehicle 10"); a plurality of replacement stations 20A to 20C (hereinafter sometimes representatively referred to as "replacement station 20"); facility servers 200A to 200C provided for the replacement stations 20A to 20C, respectively (hereinafter sometimes representatively referred to as "facility server 200"); charging stations 30A, 30B (hereinafter sometimes representatively referred to as "charging station 30"); facility serves 200D, 200E provided for the charging stations 30A, 30B, respectively (like the facility serves 200A to 200C, hereinafter sometimes representatively referred to as "facility server 200"); and a management server 100. The vehicles 10A, 10B, the facility serves 200A to 200E, and the management server 100 can communicate with each other through a communication network 900.

The vehicle 10 includes a battery 11, an Electronic Control Unit (ECU) 12, a drive unit 13, a Data Communication Module (DCM) 14, and a Human Machine Interface (HMI) 15. The battery 11 is mounted on the vehicle 10 in a state of storing electric power used for traveling of the vehicle 10 and being replaceable by a later-described replacement device 21. The battery 11 is constituted by, for example, a lithium-ion battery. However, the present disclosure is not limited thereto, and the battery 11 may be constituted by another type of battery, for example, a nickel-hydrogen battery or an all-solid-state battery.

ECU 12 includes Central Processing Unit (CPU), memories, and Global Positioning System (GPS). It includes Random Access Memory (RAM) and Read Only Memory (ROM) and stores programming and data used in CPU. CPU executes a predetermined process defined by the program in accordance with the program and the data stored in the memory and the data inputted from the outside, and stores the data of the executed result in the memory or outputs the data to the outside. GPS detects location data of the vehicles 10 and delivers it to CPU.

The drive unit 13 includes a motor generator, and an inverter that drives the motor generator by using the electric power of the battery 11 and charges the battery 11 with the regenerative electric power generated by the motor generator. The drive unit 13 may further include an engine that drives the motor generator or the vehicle 10 by operating with fuel. That is, the vehicle 10 may be a Battery Electric Vehicle (BEV) that includes a motor generator, but does not include an engine, or may be a Hybrid Electric Vehicle (HEV) or a Plug-in Hybrid Electric Vehicle (PHEV) that includes a motor generator and an engine. In addition, the vehicles 10 may be Fuel Cell Electric Vehicle (FCEV).

DCM 14 is a module for communicating with an external device via the communication network 900, and transmits data from ECU 12 to the external device, and transfers data from the external device to ECU 12.

HMI 15 is provided in the vicinity of the driver's seat of the vehicle 10, and receives information inputted from the user and outputs the information to ECU 12, and displays or audibly notifies the user of the information from ECU 12, and includes, for example, a touch panel display.

The facility server 200 includes a CPU 210, a memory 220, a communication unit 230, and a mass storage device 240. The memory 220 includes Random Access Memory (RAM) and Read Only Memory (ROM). The communication unit 230 can communicate with an external device via the communication network 900, transmits data from CPU 210 to the external device, and transfers data from the external device to CPU 210. The mass storage device 240 is composed of Hard Disk Drive (HDD) or Solid State Drive (SSD), and stores programs and data used in CPU 210. CPU 210 executes a predetermined process defined by the program in accordance with the program and the data stored in the memory 220 or the mass storage device 240 and the data inputted from the external device to the communication unit 230, and causes the memory 220 or the mass storage device 240 to store the data resulting from the execution, or causes the communication unit 230 to output the data to the external device.

The replacement station 20 includes a replacement device 21 and a facility server 200. Note that, in FIG. 1, an example is shown in which one replacement device 21 is provided at one replacement station 20, but the present disclosure is not limited thereto, and a plurality of replacement devices 21 may be provided at one replacement station 20. The replacement device 21 is managed by the facility server 200, and is controlled by a control unit of the replacement device 21 to remove the battery 11 of the vehicle 10 from the vehicle 10, move the removed battery 11 to a storage location, start charging the moved battery 11, take out the charged battery 11 from the storage location, and attach the removed battery 11 to the vehicle 10.

The charging station 30 includes a charging device 31 and a facility server 200. Note that, in FIG. 1, an example is shown in which one charging device 31 is provided at one charging station 30, but the present disclosure is not limited thereto, and a plurality of charging devices 31 may be provided at one charging station 30. The charging device 31 includes a control unit 311, a power supply unit 312, and a communication unit 313. The charging device 31 is managed by the facility server 200. The control unit 311 controls the charging device 31. The power supply unit 312 is controlled by the control unit 311 and supplies electric power to the vehicle 10. The communication unit 313 is controlled by the control unit 311 and communicates with an external device such as the facility server 200.

The management server 100 includes a CPU 110, a memory 120, a communication unit 130, and a mass storage device 140. The management server 100 manages the replacement of the battery 11 at the replacement station 20 and the charging of the battery 11 at the charging station 30. The functions of the CPU 110, the memory 120, the communication unit 130, and the mass storage device 140 of the management server 100 are the same as those of CPU 210, the memory 220, the communication unit 230, and the mass storage device 240 of the facility server 200 described above, respectively.

In the battery charging/replacement information providing system 1 described above, the time it takes to replace the battery 11 of one vehicle is different from the time it takes to charge the battery 11 of one vehicle. For example, depending on the situation, it takes about 5 minutes for replacement and about 30 minutes for charging. Therefore, even if the replacement station 20 and the charging station 30 have the same length of waiting line, the waiting time is different therebetween. However, if the replacement station 20 and the charging station 30, which have about the same length of waiting line, are displayed on the map on the screen of HMI 15 with icons of the same color, the user who views the map may misunderstand that the degree of congestion between the replacement station 20 and the charging station 30 is the same level and the waiting time is the same level.

Therefore, the display control method is a display control method that is performed by the ECU 12 configured to control the HMI 15 for displaying information on the charging station 30 and the replacement station 20 for the battery 11 mounted on the vehicle 10. The display control method includes the step of: calculating, by the ECU 12, the waiting time using the number of waiting vehicles 10 at the charging station 30 or the replacement station 20 and the time it takes to charge or replace the battery per vehicle 10; and controlling the HMI 15 to display information on the charging station 30 or the replacement station 20 in a predetermined display mode according to the calculated waiting time.

Thus, information regarding the charging station 30 or the replacement station 20 can be displayed in the predetermined display mode according to the waiting time calculated using the number of waiting vehicles 10 at the charging station 30 or the replacement station 20 for the battery 11 mounted on the vehicle 10 and the time it takes to charge or replace the battery 11 per vehicle 10. As a result, user's misunderstanding regarding the waiting times for the charging station 30 and the replacement station 20 can be reduced.

Figure 3:
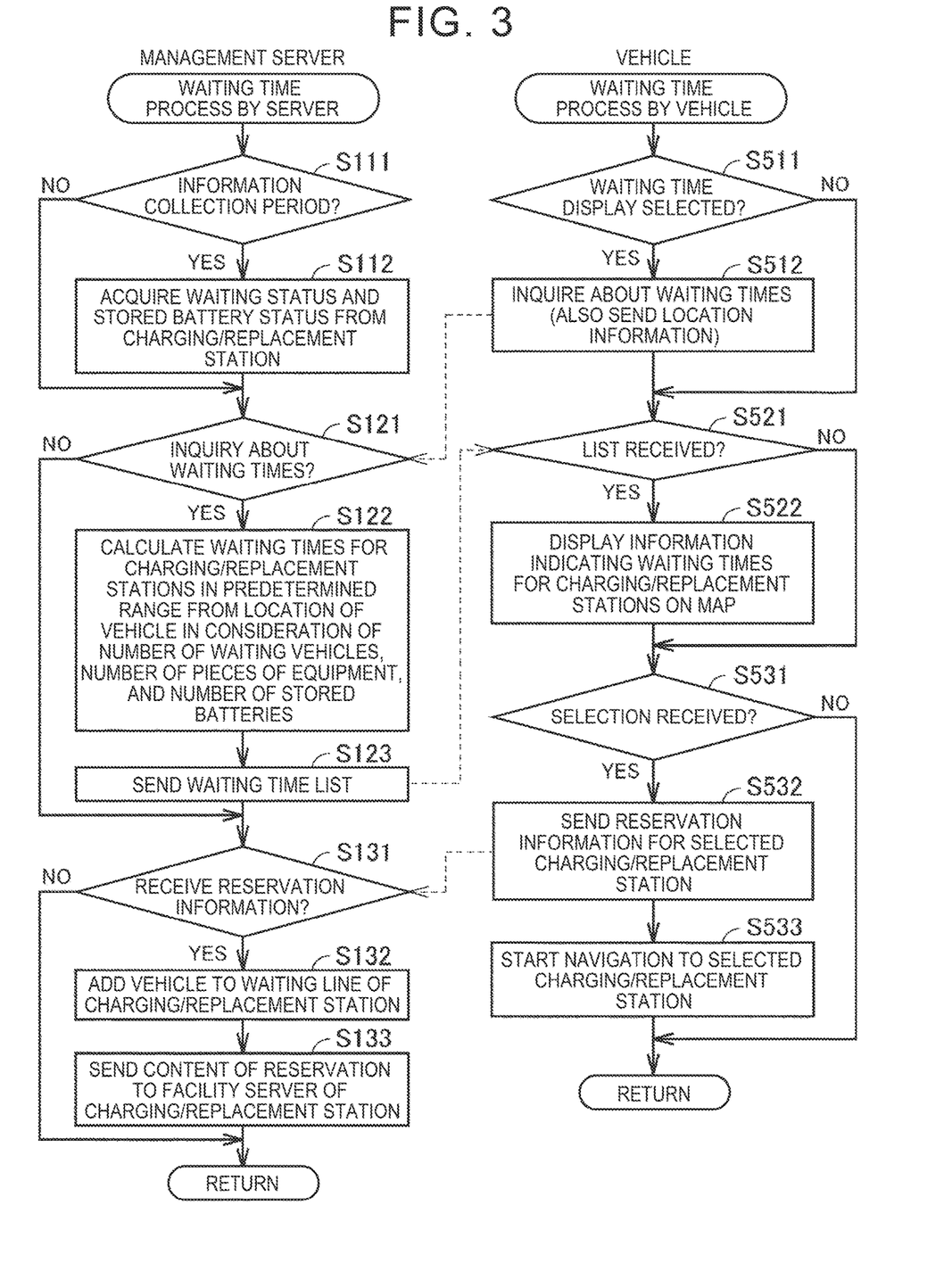
FIG. 3 is a flowchart showing a flow of processing related to a waiting time in this embodiment.

FIG. 3 is a flowchart illustrating a flow of processing related to a waiting time in this embodiment. Referring to FIG. 3, as the processing related to the waiting time, the waiting time server side processing is executed in the management server 100, and the waiting time vehicle side processing is executed in the vehicle 10. The waiting time server-side process is called and executed by The CPU 110 of the management server 100 at predetermined intervals from the higher-level process. The waiting time process to be performed by the vehicle is called and executed by ECU 12 of the vehicle 10 every predetermined period (for example, a predetermined period between several ms and several tens of ms) from the higher-level process.

At the replacement station 20, the facility server 200 counts the number of vehicles 10 waiting to replace the battery 11 and the number of batteries 11 stored in a charged state up to a predetermined SOC (for example, 100%, 80% or more). In the charging station 30, the facility server 200 counts the number of vehicles 10 in which the battery 11 is charged.

The CPU 110 of the management server 100 determines whether the replacement station 20 and the charging station 30 have reached a period for collecting data (S111). When it is determined that the information collection period is reached (YES in S111), CPU 110 acquires, from the plurality of charging stations 30 managed by the management server 100 and the facility server 200 of the replacement station 20, a waiting state such as the number of waiting vehicles 10, and a storage battery state such as the number of batteries 11 stored in a state of being charged to a predetermined SOC (for example, 100%, 80% or more) in the case of the replacement station 20, and stores them in the mass storage device 140 (S112).

In vehicles 10, ECU 12 determines whether an action has been made to display waiting times on the maps displayed in HMI 15 from the user in HMI 15 (S511). If it is determined that waiting time display is selected (YES in S511), the ECU 12 controls the DCM 14 to send the current location information of the vehicle 10 to the management server 100 to inquire the management server 100 about the waiting times to replace the battery 11 at the replacement station 20 and to charge the battery 11 at the charging station 30 (S512).

When the management server 100 determines that the information collection period is not reached (NO in S111), or after S112, CPU 110 determines whether there is an inquiry about the waiting time from the vehicle 10 (S121).

If it is determined that there is an inquiry of the waiting time (YES in S121), CPU 110 calculates the waiting time of the charging station 30 and the replacement station 20 in a predetermined range (for example, a range within a predetermined radius and a range within a predetermined time) from the received location of the vehicle 10 by considering the number of waiting units, the number of facilities of the charging device 31 and the replacement device 21, and the number of batteries 11 stored at a predetermined SOC (S122).

For example, when two vehicles 10 are being charging (elapsed time since the start of charging is 10 minutes and 20 minutes, respectively), three vehicles 10 are waiting, and the average charging time per vehicle is 30 minutes at the charging station 30 with two charging device 31, the number of waiting vehicles 10 will be two in 10 minutes, one in 20 minutes, and zero in 40 minutes, and the number of available charging device 31 will be one in 50 minutes. Therefore, the waiting time of the charging station 30 is calculated to be 50 minutes.

When the battery of one vehicle 10 is being replaced (elapsed time since the start of replacement is three minutes), five vehicles 10 are waiting, the average replacement time per vehicle is five minutes, and eight batteries 11 are stored with a predetermined SOC at the replacement station 20 with one replacement device 21, the number of waiting vehicles 10 will be four and the number of stored batteries will be seven in two minutes, the number of waiting vehicles 10 will be three and the number of stored batteries will be six in seven minutes, the number of waiting vehicles 10 will be two and the number of stored batteries will be five in 12 minutes, the number of waiting vehicles 10 will be one and the number of stored batteries will be four in 17 minutes, the number of waiting vehicles 10 will be zero and the number of stored batteries will be three in 22 minutes, and the number of available replacement device 21 will be one and the number of stored batteries will be two in 27 minutes. Therefore, the waiting time for the replacement station 20 is calculated to be 27 minutes.

CPU 110 controls the communication unit 130 to transmit a listing of the waiting times of the charging station 30 and the replacement station 20 in a predetermined range from the location of the vehicle 10 to the vehicle 10 (S123).

If it is determined in the vehicle 10 that the waiting time indication is not selected (NO in S511), or after S512, ECU 12 determines whether the waiting time listing has been received from the management server 100 (S521).

If it is determined that the waiting time list has been received (YES in S521), ECU 12 controls HMI 15 to display information indicating the waiting time of the charging station 30 and the replacement station 20 on the map displayed in HMI 15 based on the received waiting time list (S522). Here, the charging station 30 and the replacement station 20 whose waiting time is within a predetermined time (for example, one hour) are displayed.

Figure 4:
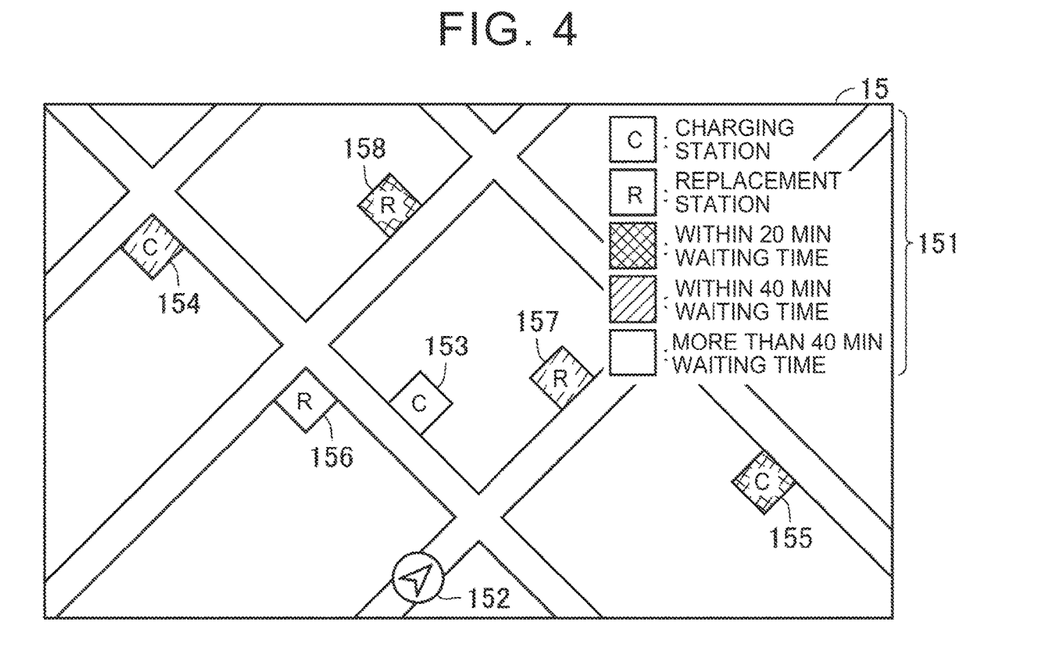
FIG. 4 is a diagram illustrating an example of a display mode of information indicating waiting times for charging stations and replacement stations according to the first embodiment.

FIG. 4 is a diagram illustrating an example of a display mode of information indicating a waiting time of the charging station 30 and the replacement station 20 according to the first embodiment. Referring to FIG. 4, on the map displayed on HMI 15, a legend 151, an icon 152 indicating the current location of the vehicle 10, icon 153, 154, and 155 indicating the locations of the charging stations 30, and icon 156, 157, and 158 indicating the locations of the replacement stations 20 are displayed. Icons 153, 154, and 155 indicating the locations of the charging stations 30 and icons 156, 157, and 158 indicating the locations of the replacement stations 20 are displayed in a display mode that differs depending on the waiting time (here, the same color is dark if the waiting time is within 20 minutes, the same color is moderately dark if the waiting time is within 40 minutes, and the same color is light if the waiting time is greater than 40 minutes).

Returning to FIG. 3, if it is determined in the vehicle 10 that the waiting time list has not been received (NO in S521), or after S522, ECU 12 determines whether or not the selection of the icons of the charging station 30 and the replacement station 20 has been accepted by the user touching the touch panel on the screen of HMI 15 (S531).

If it is determined that the selection of the icon is accepted (YES in S531), ECU 12 controls DCM 14 to transmit information for identifying the vehicle 10, information indicating the selected charging station 30 or the replacement station 20, and information indicating the scheduled arrival time to the management server 100 as information for reserving the selected charging station 30 or the replacement station 20 (S532).

The ECU 12 then controls the HMI 15 to initiate navigation-system guidance to the selected charging station 30 or replacement station 20 (S533). When it is determined that the selection of the icon is not accepted (NO in S531), or after S533, the ECU 12 returns the processing to be executed to the processing of the upper level of the caller of the waiting time vehicle-side processing.

In the management server 100, the CPU 110 determines whether reservation data has been received from the vehicles 10 (S131). When it is determined that the reservation information is received (YES in S131), the CPU 110 adds the vehicle 10 to the waiting line of the charging station 30 or the replacement station 20 based on the reservation information (S132).

Then, CPU 110 controls the communication unit 130 to transmit the information indicating the vehicle 10 and the information indicating the scheduled arrival time as the reservation content to the facility server 200 of the charging station 30 or the replacement station 20 to be reserved (S133). When it is determined that the reserved information has not been received (NO in S131), or after S133, CPU 110 returns the processing to be executed to the processing of the upper level of the caller of the waiting time server-side processing.

Second Embodiment

Figure 5:
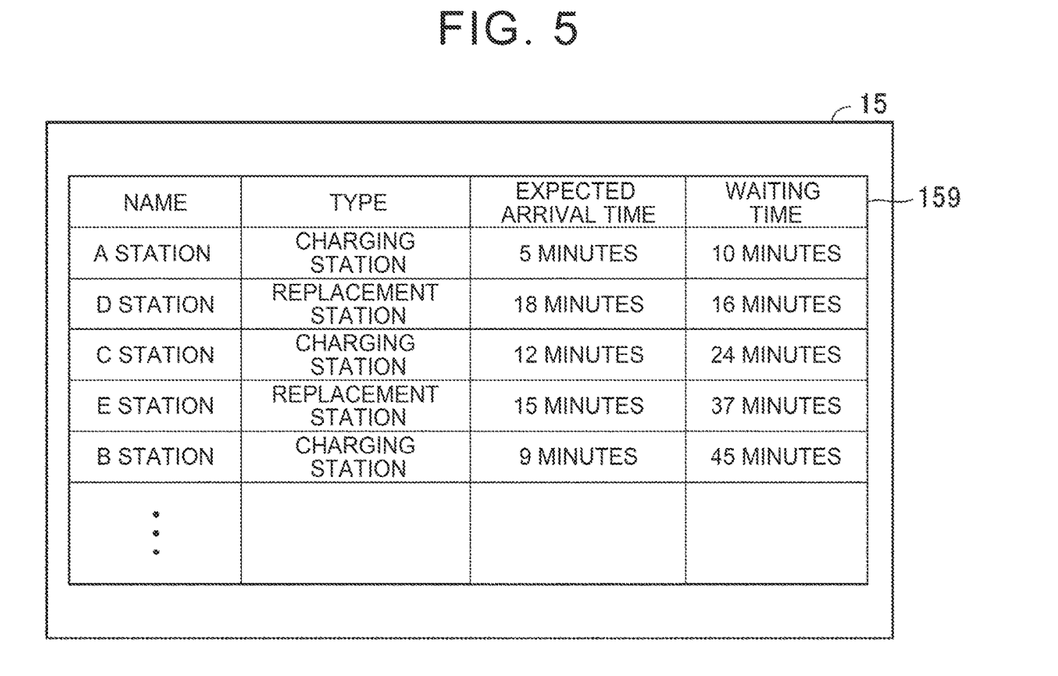
FIG. 5 is a diagram illustrating an example of a display mode of information indicating waiting times for charging stations and replacement stations according to a second embodiment.

In the first embodiment, the waiting times for the charging station 30 and the replacement station 20 are distinguished by the display mode of icons on the map showing the charging station 30 and the replacement station 20. In the second embodiment, the information indicating the waiting time of the charging station 30 and the replacement station 20 is displayed in a list form, so that the waiting time of the charging station 30 and the replacement station 20 is distinguished.

FIG. 5 is a diagram illustrating an example of a display mode of information indicating a waiting time of the charging station 30 and the replacement station 20 according to the second embodiment. Referring to FIG. 5, a listing 159 displayed on HMI 15 displays the name of the charging station 30 or the replacement station 20, the type indicating whether the station is a charging station or a replacement station, the scheduled time required to arrive at the charging station 30 or the replacement station 20 from the current location, and the waiting time for the charging station 30 or the replacement station 20.

MODIFIED EXAMPLES (1) In the above embodiment, as illustrated in FIGS. 1 and 2, the battery 11 of the vehicle 10 is automatically replaced by the replacement device 21 in the replacement station 20. However, the present disclosure is not limited thereto, and the battery 11 of the vehicle 10 may be manually replaced by an operator of the replacement station 20.

(2) In the above embodiment, as illustrated in FIGS. 1 to 5, a display device that displays information on the charging station 30 and the replacement station 20 is a HMI 15. However, the present disclosure is not limited thereto, and any other device may be used as long as it is a display device that displays information on the charging station 30 and the replacement station 20, and may be, for example, a portable terminal carried by a user.

(3) In the above embodiment, as illustrated in FIGS. 1 and 2, the charging device 31 is provided in the charging station 30, while the replacement device 21 is provided in the replacement station 20. However, there may be a station including both the charging device 31 and the replacement device 21 without being limited thereto.

(4) In the above embodiment, as illustrated in FIG. 4, the colors of the icons indicating the charging station 30 and the replacement station 20 are different from each other to distinguish the waiting time. However, the present disclosure is not limited thereto, and the waiting time may be distinguished by changing the size, shape, pattern, or color of the icon or a combination thereof.

(5) In the above embodiment, as shown in S522 of FIG. 3, the charging station 30 and the replacement station 20 having a waiting time of a predetermined time are displayed on the map. However, the present disclosure is not limited thereto, and the charging station 30 and the replacement station 20 may be displayed regardless of the waiting time.

(6) In the above embodiment, as illustrated in FIG. 3, S111, S112, S122, S123, S133 process is executed by the CPU 110 of the management server 100. However, the present disclosure is not limited thereto, and these processes may be executed by another control device, for example, an ECU 12 of the vehicles 10.

(7) In the above embodiment, as illustrated in FIG. 3, the ECU 12 of the vehicles 10 executes the process of S533 from S511. However, the present disclosure is not limited thereto, and these processes may be executed by another control device, for example, a mobile terminal carried by a user.

(8) The above embodiment can be regarded as disclosure of the battery charging/replacement information providing system 1, the vehicle 10, the management server 100, or the facility server 200, and can be regarded as disclosure of a control method or a control program for executing predetermined processing by the battery charging/replacement information providing system 1, the vehicle 10, the management server 100, or the facility server 200.

SUMMARY (1) As illustrated in FIGS. 1 to 3, the display control method is a display control method by the ECU 12 of the vehicle 10 that controls HMI 15 for displaying the information on the charging station 30 and the replacement station 20 of the battery 11 mounted on the vehicle 10 and the CPU 110 of the management server 100. As shown in FIG. 3, the display control method includes: the steps of: calculating, by the CPU 110 of the management server 100, a waiting time using the number of waiting vehicles 10 at the charging station 30 or the replacement station 20 and the time required to charge or replace the battery 11 per vehicle 10 (e.g., S122); and controlling, by the ECU 12 of the vehicle 10, the HMI 15 to display information on the charging station 30 or the replacement station 20 in a predetermined display mode according to the calculated waiting time (e.g., S522).

Thus, the information on the charging station 30 or the replacement station 20 can be displayed in a predetermined display mode according to the waiting time calculated using the number of waiting vehicles 10 at the charging station 30 or the replacement station 20 of the battery 11 mounted on the vehicle 10 and the time required to charge or replace the battery 11 per vehicle 10. As a result, user's misunderstanding regarding the waiting times for the charging station 30 and the replacement station 20 can be reduced.

(2) As illustrated in FIG. 3, in the CPU 110 of the management server 100, in the step of calculating the waiting time, the waiting time may be calculated by considering the number of units that can be simultaneously charged by the charging station 30 or the number of units that can be simultaneously replaced by the replacement station 20.

As a result, the waiting time can be calculated more accurately. As a result, the user's misunderstanding regarding the waiting times for the charging station 30 and the replacement station 20 can further be reduced.

(3) As illustrated in FIG. 3, the CPU 110 of the management server 100 may calculate the waiting time by considering the number of replaceable batteries 11 stored in the replacement station 20 in the step of calculating the waiting time.

As a result, the waiting time can be calculated more accurately. As a result, user's misunderstanding regarding the waiting times of the charging station 30 and the replacement station 20 can further be reduced.

(4) As shown in FIG. 3, in the step of controlling to display information on the charging station 30 or the replacement station 20, the ECU 12 of the vehicles 10 may control to display information on the charging station 30 or the replacement station 20 for which the waiting time is equal to or less than a predetermined time.

Thus, the information can be transmitted to the user in an easy-to-understand manner. As a result, user's misunderstanding regarding the waiting times for the charging station 30 and the replacement station 20 can further be reduced.

The embodiment disclosed herein should be considered to be exemplary and not restrictive in all respects. The scope of the present disclosure is shown by the scope of claims rather than the description of the above embodiments, and is intended to include all modifications within the meaning and the scope equivalent to the scope of claims.

What is claimed is:

1. A display control method that is performed by a processor of a vehicle, the vehicle including a display device and a battery, the processor being configured to control the display device, the display device being configured to display information of a charging facility and a replacement facility, the display control method comprising:
    acquiring, periodically from a server of the charging facility or the replacement facility, data including a total number of waiting vehicles at the charging facility or the replacement facility and a time required to charge or replace a battery of each waiting vehicle of the waiting vehicles;
    calculating, by the processor, a waiting time based on the acquired data and an elapsed time since the data was acquired;
    determining whether the waiting time of the charging facility or the replacement facility is equal to or less than a predetermined time;
    determining whether the charging facility or the replacement facility is located within a travel time from the vehicle equal to or less than the predetermined time;
    displaying, by the display device, an icon corresponding to the information of the charging facility or the replacement facility in a case where the waiting time of the charging facility or the replacement facility is equal to or less than the predetermined time and the charging facility or the replacement facility is located within the travel time from the vehicle that is equal to or less than the predetermined time;

controlling the display device to change, a color of the icon according to the elapsed time and the waiting time such that the color becomes darker as the elapsed time increases and the waiting time decreases; and displaying, by the display device, a travel route to the charging facility or the replacement facility.

2. The display control method according to claim 1, further comprising
calculating the waiting time based on a total number of vehicles that are simultaneously chargeable at the charging facility; or
calculating the waiting time based on a total number of vehicles whose batteries are simultaneously replaceable at the replacement facility.

3. The display control method according to claim 1, further comprising calculating the waiting time based on a total number of replaceable batteries stored at the replacement facility.

4. The display control method according to claim 1, further comprising changing a size of the icon, a shape of the icon, and a pattern of the icon according to the elapsed time and the waiting time.

5. The display control method according to claim 1, further comprising displaying the information in a list including a name of the charging facility or the replacement facility, a type of the charging facility or the replacement facility, the travel time required to arrive at the charging facility or the replacement facility, and the waiting time of the charging facility or the replacement facility.

6. The display control method according to claim 1, further comprising transmitting vehicle information of the vehicle to the server, the vehicle information including identification information, information indicating that the charging facility or the replacement facility is selected as a travel target, information indicating the travel time required to arrive at the charging facility or the replacement facility.

7. A display control device for a vehicle, the vehicle including a display device and a battery, the display control device being configured to control the display device, the display device being configured to display information corresponding to a charging facility and a replacement facility, the display control device comprising:

a processor configured to communicate with a server of the charging facility or the replacement facility; and an interface including the display device, wherein the processor is configured to:

acquire, periodically from the server, data including a total number of waiting vehicles at the charging facility or the replacement facility and a time required to charge or replace a battery of each waiting vehicle of the waiting vehicles;

calculate a waiting time based on the data and an elapsed time since the data was acquired;

determine whether the waiting time of the charging facility or the replacement facility being equal to or less than a predetermined time;

determine whether the charging facility or the replacement facility is located within a travel time from the vehicle equal to or less than the predetermined time;

display, via the display device, an icon corresponding to the information of the charging facility or the replacement facility in a case where the waiting time of the charging facility or the replacement facility is equal to or less than the predetermined time and the charging facility or the replacement facility is located within the travel time from the vehicle that is equal to or less than the predetermined time;

control the display device to change a color of the icon according to the elapsed time and the waiting time such that the color becomes darker as the elapsed time increases and the waiting time decreases; and display, via the display device, a travel route to the charging facility or the replacement facility.

* * * * *